United States Patent
Tulasi

(10) Patent No.: US 10,645,063 B2
(45) Date of Patent: May 5, 2020

(54) PREDICTING FIREWALL RULE RANKING VALUE

(71) Applicant: Juniper Networks, Inc., Sunnyvale, CA (US)

(72) Inventor: Vinuth Tulasi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 190 days.

(21) Appl. No.: 15/827,027

(22) Filed: Nov. 30, 2017

(65) Prior Publication Data
US 2018/0091474 A1    Mar. 29, 2018

Related U.S. Application Data

(63) Continuation of application No. 14/752,355, filed on Jun. 26, 2015, now Pat. No. 9,838,354.

(51) Int. Cl.
*H04L 29/06* (2006.01)

(52) U.S. Cl.
CPC .......... *H04L 63/02* (2013.01); *H04L 63/0245* (2013.01); *H04L 63/0263* (2013.01); *H04L 63/20* (2013.01); *H04L 63/0236* (2013.01)

(58) Field of Classification Search
CPC . H04L 63/0263; H04L 63/20; H04L 63/0245; H04L 63/02
See application file for complete search history.

(56) References Cited

U.S. PATENT DOCUMENTS

| | | | | |
|---|---|---|---|---|
| 6,484,261 B1* | 11/2002 | Wiegel | ............... | H04L 41/0856 715/763 |
| 6,829,604 B1* | 12/2004 | Tifft | ...................... | G16H 10/60 707/707 |
| 7,035,849 B2* | 4/2006 | Tifft | ...................... | G16H 10/60 |
| 7,810,150 B2* | 10/2010 | Brooks | .............. | H04L 63/0263 709/223 |
| 7,966,655 B2* | 6/2011 | Acharya | ............. | H04L 63/0263 726/11 |
| 8,042,167 B2* | 10/2011 | Fulp | ....................... | H04L 63/20 370/351 |

(Continued)

OTHER PUBLICATIONS

Computer Desktop Encyclopedia, Definition of Processor, Feb. 25, 2014, 1 page.

*Primary Examiner* — Sharon S Lynch
(74) *Attorney, Agent, or Firm* — Harrity & Harrity, LLP

(57) ABSTRACT

A device may obtain information regarding firewall rules. The information, for a firewall rule of the firewall rules, may include one or more match condition values and a ranking value. The firewall rule may be applicable to packets that are associated with packet information that matches the match condition values. A match condition value may be associated with a match count that identifies a quantity of times that packets match the match condition value. The ranking value may identify a quantity of times that the firewall rule has been applied to the packets. The device may obtain a new firewall rule. The device may predict a ranking value of the new firewall rule based on match condition values of the new firewall rule and/or based on analyzing the information regarding the plurality of firewall rules. The device may perform an action based on the predicted ranking value.

20 Claims, 8 Drawing Sheets

(56) References Cited

U.S. PATENT DOCUMENTS

| | | | |
|---|---|---|---|
| 8,418,240 B2* | 4/2013 | Wool | H04L 63/0263 726/11 |
| 8,490,171 B2* | 7/2013 | Harrison | H04L 63/0263 726/12 |
| 8,819,762 B2 | 8/2014 | Harrison et al. | |
| 8,949,418 B2* | 2/2015 | Bray | H04L 63/02 709/224 |
| 9,043,461 B2* | 5/2015 | Bray | H04L 63/02 709/224 |
| 9,160,768 B2* | 10/2015 | Sikka | H04L 63/20 |
| 9,553,845 B1* | 1/2017 | Talmor | H04L 63/0263 |
| 9,565,213 B2* | 2/2017 | Rogers | H04L 63/20 |
| 9,838,354 B1 | 12/2017 | Tulasi | |
| 2002/0107953 A1* | 8/2002 | Ontiveros | H04L 43/06 709/224 |
| 2002/0133586 A1* | 9/2002 | Shanklin | H04L 43/00 709/224 |
| 2003/0051165 A1* | 3/2003 | Krishnan | H04L 63/0227 726/4 |
| 2003/0120652 A1* | 6/2003 | Tifft | G16H 10/60 |
| 2003/0212900 A1* | 11/2003 | Liu | H04L 63/0263 726/13 |
| 2004/0177139 A1* | 9/2004 | Schuba | H04L 41/0873 709/223 |
| 2004/0205360 A1* | 10/2004 | Norton | H04L 63/0227 726/23 |
| 2004/0268150 A1* | 12/2004 | Aaron | H04L 63/0209 726/11 |
| 2005/0138416 A1* | 6/2005 | Qian | H04L 63/08 726/4 |
| 2005/0229246 A1* | 10/2005 | Rajagopal | H04L 63/0236 726/14 |
| 2005/0251570 A1* | 11/2005 | Heasman | G06F 21/55 709/224 |
| 2006/0195896 A1* | 8/2006 | Fulp | H04L 63/0263 726/11 |
| 2006/0248580 A1* | 11/2006 | Fulp | H04L 63/0263 726/11 |
| 2006/0294577 A1* | 12/2006 | Gouda | H04L 63/0263 726/1 |
| 2007/0143827 A1* | 6/2007 | Nicodemus | G06F 21/6218 726/2 |
| 2008/0005795 A1* | 1/2008 | Acharya | H04L 63/0263 726/23 |
| 2008/0168392 A1* | 7/2008 | Brooks | H04L 63/0263 715/810 |
| 2008/0301765 A1* | 12/2008 | Nicol | H04L 41/142 726/1 |
| 2009/0138938 A1* | 5/2009 | Harrison | G06F 21/604 726/1 |
| 2009/0172800 A1* | 7/2009 | Wool | G06F 21/604 726/11 |
| 2010/0011433 A1* | 1/2010 | Harrison | H04L 63/0263 726/12 |
| 2011/0055916 A1* | 3/2011 | Ahn | H04L 63/0227 726/13 |
| 2011/0178624 A1* | 7/2011 | Baseman | G06N 5/025 700/104 |
| 2011/0258209 A1* | 10/2011 | Gagliardi | G06F 11/3006 707/758 |
| 2012/0180104 A1* | 7/2012 | Gronich | H04L 63/20 726/1 |
| 2014/0282855 A1* | 9/2014 | Clark | H04L 41/14 726/1 |
| 2015/0235126 A1* | 8/2015 | de Borst | H04L 47/10 706/47 |
| 2015/0237013 A1* | 8/2015 | Bansal | H04L 63/0263 726/13 |
| 2016/0191466 A1* | 6/2016 | Pernicha | H04L 63/20 726/1 |

* cited by examiner

100 ⟶

| Firewall Rule | Match Condition Values | Rule Hit Count (Ranking Value) |
|---|---|---|
| Rule 1 | ... | 75 |
| Rule 2 | ... | 23 |
| Rule 3 | ... | 18 |
| Rule 4 | ... | 05 |

New firewall rule received. Analyze match condition values and ranking values of implemented firewall rules to predict ranking value of new firewall rule Firewall Device

| Firewall Rule | Match Condition Values | Rule Hit Count (Ranking Value) |
|---|---|---|
| Rule 1 | ... | 75 |
| Rule 2 | ... | 23 |
| Rule 5 | ... | 20 (predicted) |
| Rule 3 | ... | 18 |
| Rule 4 | ... | 05 |

Firewall Device

FIG. 1B

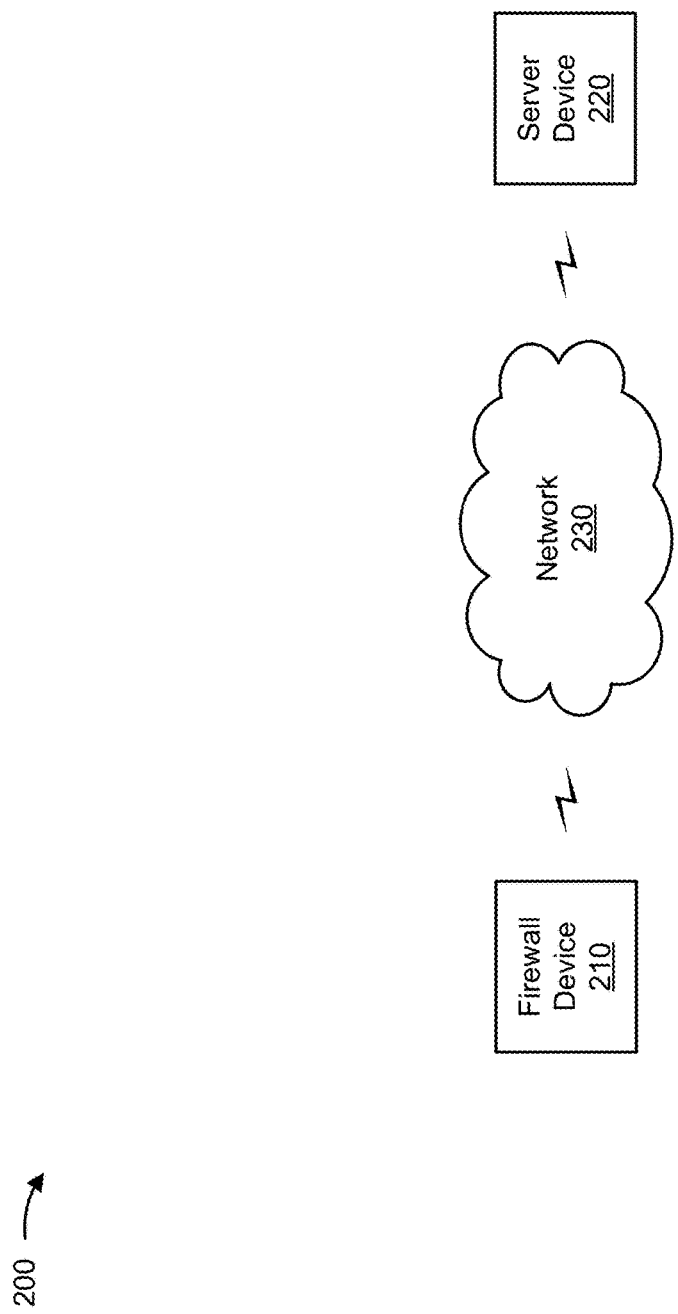

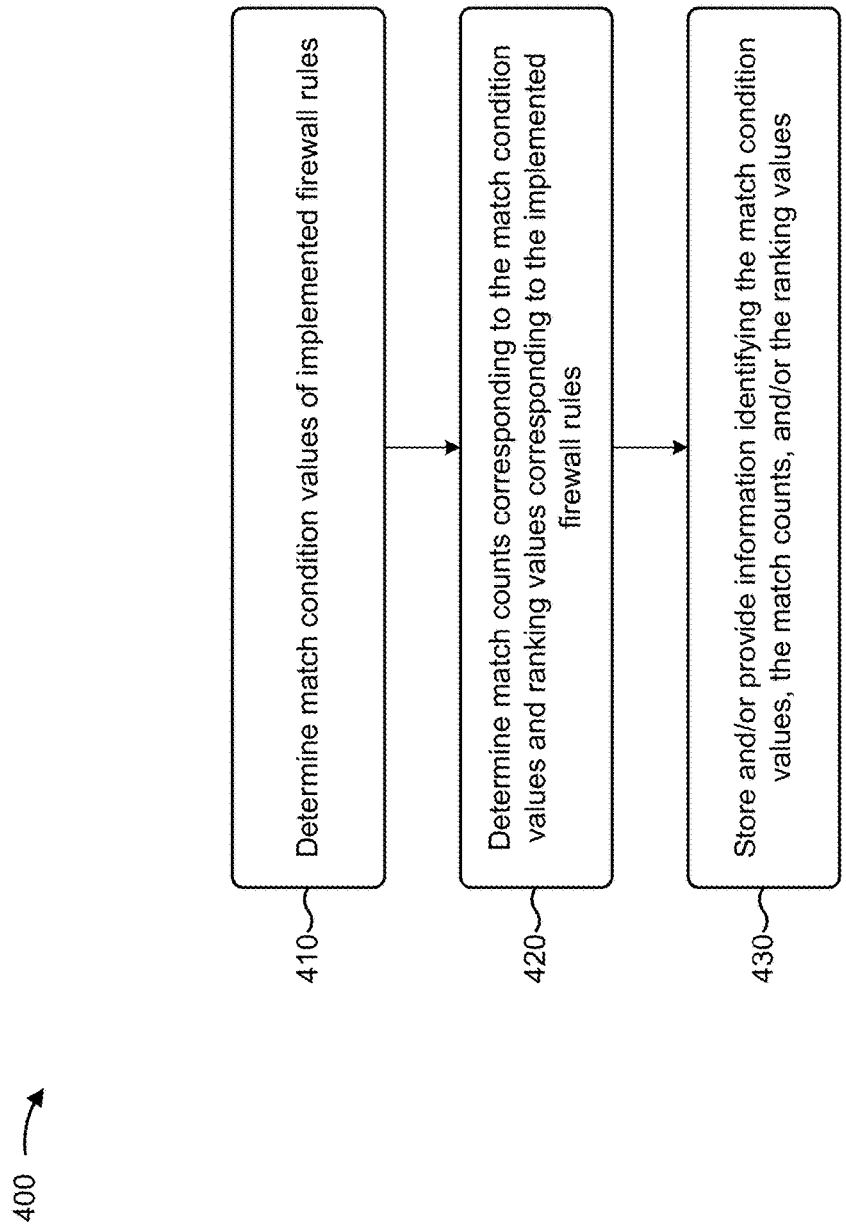

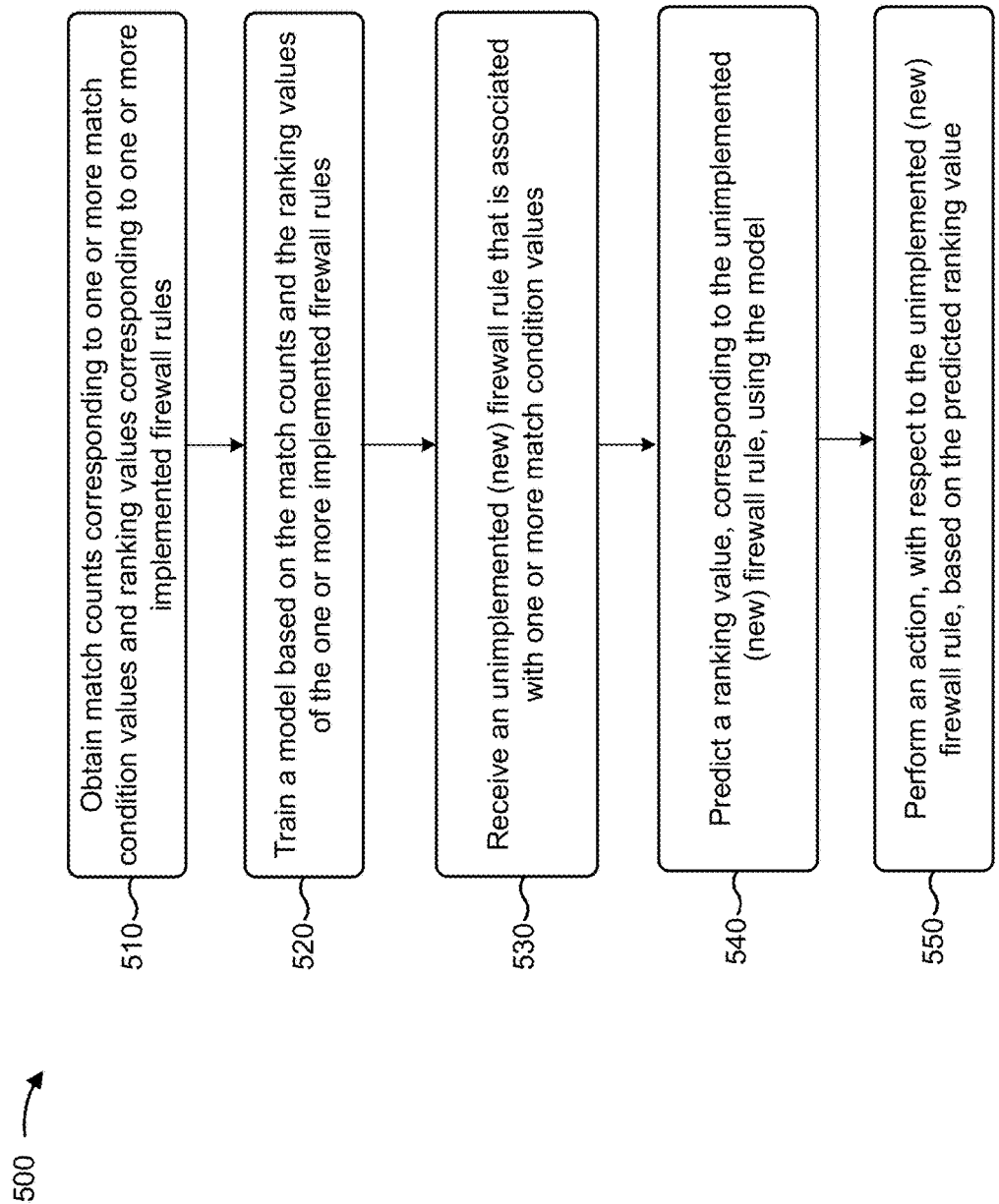

PREDICTING FIREWALL RULE RANKING VALUE

RELATED APPLICATION

This application is a continuation of U.S. patent application Ser. No. 14/752,355, filed Jun. 26, 2015 (now U.S. Pat. No. 9,838,354), which is incorporated herein by reference.

BACKGROUND

A firewall device may enforce firewall rules pertaining to network traffic entering, exiting, and/or flowing within a network. The firewall rules may be ranked in a particular order based, for example, on how frequently the firewall rules are applied to the network traffic.

SUMMARY

According to some possible implementations, a device may include one or more processors. The one or more processors may obtain information regarding a plurality of firewall rules. The information, for a firewall rule of the plurality of firewall rules, may include one or more match condition values and a ranking value. The firewall rule may be applicable to packets that are associated with packet information that matches the one or more match condition values associated with the firewall rule. A match condition value, of the one or more match condition values, may be associated with a match count that identifies a quantity of times that packets, received by the device, are associated with packet information that matches the match condition value. The ranking value may identify a quantity of times that the firewall rule has been applied to the packets received by the device. The one or more processors may obtain a new firewall rule that may include one or more match condition values. The one or more processors may predict a ranking value, as a predicted ranking value, of the new firewall rule based on the one or more match condition values of the new firewall rule and/or based on analyzing the information regarding the plurality of firewall rules. The one or more processors may perform an action, with regard to the new firewall rule, based on the predicted ranking value.

According to some possible implementations, a computer-readable medium may store instructions. The instructions may include one or more instructions that, when executed by one or more processors of a device, cause the one or more processors to obtain information regarding a plurality of firewall rules. The information, for a firewall rule of the plurality of firewall rules, may include one or more match condition values and a ranking value. The firewall rule may be applicable to packets that are associated with packet information that matches the one or more match condition values associated with the firewall rule. A match condition value, of the one or more match condition values, may be associated with a match count that identifies a quantity of times that packets, received by the device, are associated with packet information that matches the match condition value. The ranking value may identify a quantity of times that the firewall rule has been applied to the packets received by the device. The one or more instructions may cause the one or more processors to obtain a new firewall rule that includes one or more match condition values. The one or more instructions may cause the one or more processors to predict a ranking value, as a predicted ranking value, of the new firewall rule based on the one or more match condition values of the new firewall rule and/or based on processing the information regarding the plurality of firewall rules. The one or more instructions may cause the one or more processors to perform an action, with regard to the new firewall rule, based on the predicted ranking value.

According to some possible implementations, a method may include obtaining, by a device, information regarding a plurality of firewall rules. The information, for a firewall rule of the plurality of firewall rules, may include a plurality of match condition values and a ranking value. The firewall rule may be applicable to packets that are associated with packet information that matches the one or more match condition values associated with the firewall rule. A match condition value, of the one or more match condition values, may be associated with a match count that identifies a quantity of times that packets, received by the device, are associated with packet information that matches the match condition value. The ranking value may identify a quantity of times that the firewall rule has been applied to the packets received by the device. The method may include obtaining, by the device, a new firewall rule that includes a plurality of match condition values. The method may include predicting, by the device, a ranking value, as a predicted ranking value, of the new firewall rule based on the plurality of match condition values of the new firewall rule and based on the information regarding the plurality of firewall rule. The method may include performing, by the device, an action, with regard to the new firewall rule, based on the predicted ranking value.

BRIEF DESCRIPTION OF THE DRAWINGS

FIGS. 1A and 1B are diagrams of an overview of an example implementation described herein;

FIG. 2 is a diagram of an example environment in which systems and/or methods, described herein, may be implemented;

FIG. 4 is a flow chart of an example process for determining match counts for predicting a ranking value of an unimplemented (new) firewall rule;

FIG. 5 is a flow chart of an example process for predicting a ranking value of an unimplemented (new) firewall rule based on match counts and/or ranking values of implemented firewall rules.

DETAILED DESCRIPTION OF PREFERRED EMBODIMENTS

Figure 3:
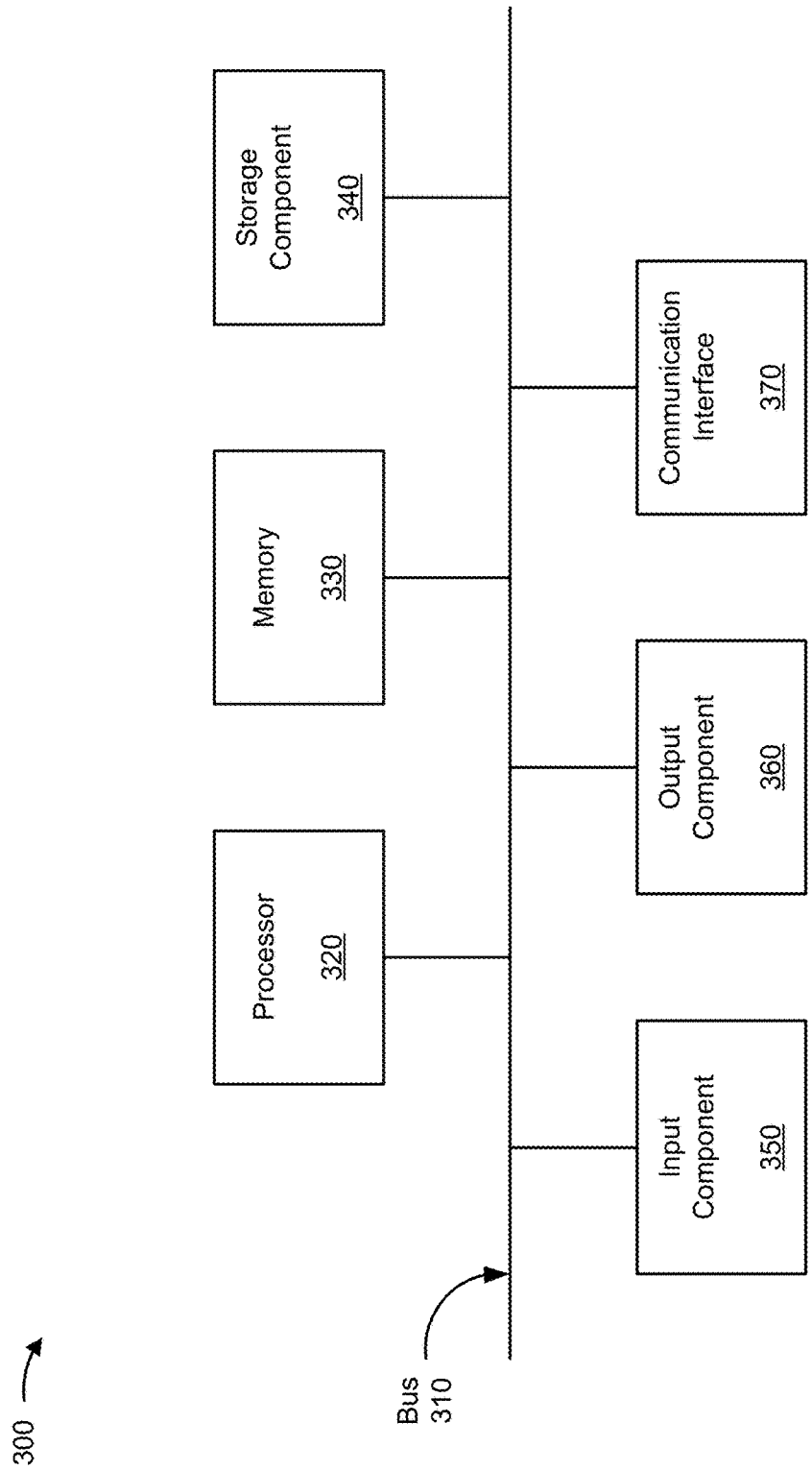
FIG. 3 is a diagram of example components of one or more devices of FIG. 2.

The following detailed description of example implementations refers to the accompanying drawings. The same reference numbers in different drawings may identify the same or similar elements.

A firewall device (e.g., a hardware firewall device, a software firewall implemented on a device, etc.) may receive network traffic (e.g., packets, etc.) that is traveling into, out of, or within a network. The firewall device may filter the network traffic by comparing packet information describing the network traffic (e.g., a source network address and/or a destination network address of the network traffic, a source network port and/or a destination network port of the network traffic, a protocol associated with the network traffic, etc.) to match condition values of a set of firewall rules, to determine whether a firewall rule, of the set of firewall rules, applies to the network traffic. When the firewall device determines that a firewall rule applies to the network traffic, the firewall device may cease checking other firewall rules, of the set of firewall rules, and may perform an action indicated by the applicable firewall rule, such as dropping the network traffic, redirecting the network traffic, or the like.

Over time, a first firewall rule may be applied to network traffic more frequently than a second firewall rule. In this case and to improve efficiency, the firewall device may check a match condition value of the first firewall rule before checking a match condition value of the second firewall rule. If the match condition value of the first firewall rule matches the packet information of a packet, the firewall device may not check whether the match condition value of the second firewall rule matches the packet information of the packet. The firewall device may increment a first ranking value (e.g., a hit counter) when the first firewall rule is applied, and may increment a second ranking value when the second firewall rule is applied.

In a situation where a new firewall rule, associated with no ranking information, is implemented, the firewall device may not be able to determine a ranking value of the new firewall rule. In such a situation, the firewall device may, for example, check the new firewall rule after checking each of the set of firewall rules. This may be problematic in situations where the new firewall rule is likely to apply to a larger quantity of packets than one or more of the set of firewall rules, because the firewall device may use time and/or processor power to check each of the set of firewall rules before checking the new firewall rule. Implementations described herein may enable the firewall device to predict a ranking value of the new firewall rule and to rank the new firewall rule accordingly, which may improve efficiency of the firewall device and/or reduce processing power used by the firewall device to check firewall rules, before the new firewall rule, that may be less likely to apply to a packet than the new firewall rule.

FIGS. 1A and 1B are diagrams of an overview of an example implementation 100 described herein. As shown in FIG. 1A, a firewall device may enforce a set of firewall rules (e.g., Rule 1, Rule 2, Rule 3, and Rule 4), As further shown, each firewall rule, of the set of firewall rules, may be associated with a set of match condition values. The firewall device may determine whether packet information, associated with a received packet e.g., packet information identifying a source Internet Protocol (IP) address, a destination IP address, a source network port, a destination network port, a protocol, etc.), matches a match condition value of a firewall rule. The firewall device may apply the firewall rule, associated with the match condition value, to the received packet when the information associated with the received packet matches the match condition value.

As shown in FIG. 1A, the set of firewall rules may be associated with a set of ranking values (e.g., hit counts). A ranking value of a firewall rule may identify a quantity of times that the firewall rule has been applied to a packet. The firewall rules may be ranked in a particular order based on the corresponding ranking values. Here, a firewall rifle associated with a greater ranking value is ranked higher than a firewall rule associated with a lesser ranking value.

As shown, the firewall device may receive a new rule that is associated with no ranking value (e.g., based on not having been implemented and/or applied to packets). As shown, the firewall device may analyze match condition values and ranking values of implemented firewall rules to predict a ranking value of the new firewall rule. By predicting the ranking value of the new firewall rule, the firewall device may apply the new firewall rule more frequently than one or more of the existing firewall rules, and may accordingly check the new firewall rule before the one or more of the existing firewall rules.

As shown in FIG. 1B, the firewall device may determine a predicted ranking value for the new firewall rule. As further shown, based on the predicted ranking value, the firewall device may rank the new firewall rule below Rule 1 and Rule 2, and above Rule 3 and Rule 4. In this way, the firewall device may predict a ranking value of a newly implemented firewall rule, which may permit the firewall device to more accurately rank the newly implemented firewall rule relative to other firewall rules. By more accurately ranking the newly implemented firewall rule, the firewall device may reduce a quantity of inapplicable firewall rules to be checked before determining an applicable firewall rule, which may improve efficiency and/or reduce processing power used by the firewall device.

FIG. 2 is a diagram of an example environment 200 in which systems and/or methods, described herein, may be implemented. As shown in FIG. 2, environment 200 may include a firewall device 210, a server device 220, and a network 230. Devices of environment 200 may interconnect via wired connections, wireless connections, or a combination of wired and wireless connections.

Firewall device 210 may include one or more devices (e.g., one or more traffic transfer devices) capable of processing and/or transferring traffic between endpoint devices. For example, firewall device 210 may include a firewall, a router, a gateway, a switch, a hub, a bridge, a reverse proxy, a server (e.g., a proxy server), a security device, an intrusion detection device, a load balancer, or a similar device. Firewall device 210 may perform actions on and/or related to network traffic (e.g., packets, etc.) based on a ranked set of firewall rules, and may use and/or increment a set of ranking values associated with (e.g., corresponding to) the set of firewall rules. Firewall device 210 may store information describing the set of firewall rules locally and/or may provide the information describing the set of firewall rules to another device, such as server device 220 or the like.

Server device 220 may include one or more devices capable of determining, storing, processing, and/or providing information. In some implementations, server device 220 may include a communication interface that allows server device 220 to receive information from and/or t information to other devices in environment 200. Server device 220 may store, process, and/or provide information related to operations of firewall device 210. For example, server device 220 may store a set of firewall rules and/or information related to the set of firewall rules. In some implementations, server device 220 may receive, determine, store, and/or provide (e.g., to firewall device 210 or another device) ranking values based on the set of firewall rules and/or match counts associated with match condition values of the set of firewall rules.

Network 230 may include one or more wired and/or wireless networks. For example, network 230 may include a cellular network (e.g., a long-term evolution (LTE) network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to firewall device 210 and/or server device 220. In some implementations, firewall device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RE) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining match counts for predicting a ranking value of an unimplemented (new) firewall rule. In some implementations, one or more process blocks of FIG. 4 may be performed by firewall device 210. Additionally, or alternatively, one or more process blocks of FIG. 4 may be performed by another device or a group of devices separate from or including firewall device 210, such as server device 220.

As shown in FIG. 4, process 400 may include determining match condition values of implemented firewall rules (block 410). For example, firewall device 210 may implement a set of firewall rules, and may enforce the set of firewall rules based on match condition values associated with the set of firewall rules. A firewall rule, of the set of firewall rules that firewall device 210 implements, may be associated with a set of match condition values, such as a particular source Internet Protocol (IP) address, a particular destination IP address, a particular source network port, a particular destination network port, a particular protocol, a range of IP addresses and/or ports, or the like. If packet information associated with a packet matches each match condition value of a particular firewall rule, firewall device 210 may perform an action indicated by the particular firewall rule.

For example, assume that a first match condition value of a firewall rule specifies a particular source IP address, and assume that a second match condition value of the firewall rule specifies a particular destination IP address. If the source IP address of a packet matches the particular source IP address specified by the first match condition value, and the destination IP address of the packet matches the particular destination IP address specified by the second match condition value, firewall device 210 may perform an action specified by the firewall rule. For example, firewall device 210 may drop the packet, may reroute the packet, may modify the packet, may quarantine a source and/or a destination of the packet, may increment a match count and/or a ranking value associated with one or more of the match condition values and/or the firewall rule, or the like.

A match condition value, of the set of match condition values, may be associated with a corresponding match count that may be incremented when a firewall rule, associated with the match condition value, is applied based on a packet matching the match condition value. The match counts of the match condition values may be used to predict a ranking value of an unimplemented (new) firewall rule, as described in more detail below.

Firewall device 210 may assign a particular order to a set of firewall rules based on ranking values associated with the set of firewall rules. When determining whether to apply a firewall rule to a packet, firewall device 210 may check one or more firewall rules, of the set of firewall rules, in the particular order, until firewall device 210 identifies a firewall rule to apply. A ranking value, of a particular firewall rule, may be determined based on a quantity of times that the particular firewall rule has been applied to a packet, based on a length of time in between occasions on which the particular firewall rule is applied to a packet, based on a relative importance of network traffic to which the particular firewall rule is configured to be applied, or the like.

In some implementations, firewall device 210 may determine a ranking value, for a particular firewall rule, based on a hit count of the particular firewall rule. For example, assume that firewall device 210 has applied a particular firewall rule to packets on thirty occasions. On each of the thirty occasions, firewall device 210 may increment a hit counter associated with the particular firewall rule. Based on the hit counter, firewall device 210 may determine the ranking value. For example, the particular firewall rule may be ranked more highly than another firewall rule that has been applied to a lesser quantity of packets. In this way, firewall device 210 may assign an order to firewall rules based on hit counters associated with the firewall rules, which may conserve processing resources of firewall device 210 by prioritizing more frequently applied firewall rules and/or by reducing a quantity of less frequently applied firewall rules to check for a given packet.

As further shown in FIG. 4, process 400 may include determining match counts corresponding to the match condition values and ranking values corresponding to the implemented firewall rules (block 420). For example, the implemented firewall rules may be associated with match condition values, and may be applied to packets based on whether packet information associated with the packets matches the match condition values. When a firewall rule is applied to a packet based on the packet being associated with packet information that matches a match condition value, firewall device 210 may increment a match count associated with the match condition value, and may increment a ranking value associated with the firewall rule.

A match count, of a particular match condition value, may indicate a quantity of occasions on which a firewall rule, that is associated with the particular match condition value, has been applied to a packet. For example, consider three firewall rules: a first firewall rule, a second firewall rule, and a third firewall rule. Assume that the three firewall rules are applicable to packets associated with a particular source IP address. In other words, assume that a match condition value of each of the three firewall rules specifies that the three firewall rules are applicable to packets associated with the particular source IP address. Assume that the first firewall rule has been applied to twenty packets, that the second firewall rule has been applied to ten packets, and that the third firewall rule has been applied to forty packets. In this example, the first firewall rule may be associated with a ranking value of twenty (e.g., based on the first firewall rule having been applied to twenty packets). The match condition value the particular source IP address) may be associated with a match count of seventy, based on the first firewall rule, the second firewall rule, and the third firewall rule having been cumulatively applied to seventy packets.

In some implementations, firewall device 210 may store match counts locally. For example, firewall device 210 may apply, to a packet, a firewall rule associated with a first match condition value and a second match condition value, and may increment match counts corresponding to the first match condition value and the second match condition value accordingly. Firewall device 210 may store information identifying the match counts locally, which may improve processing speed of firewall device 210 as compared to storing and/or obtaining the information identifying the match counts from a remote device. Additionally, or alternatively, firewall device 210 may provide match counts to another device for storage and/or processing (e.g., server device 220, etc.), which may reduce local storage space requirements of firewall device 210.

As further shown in FIG. 4, process 400 may include storing and/or providing information identifying the match condition values, the match counts, and/or the ranking values (block 430). For example, firewall device 210 may store and/or provide information identifying the match condition values, the match counts, and/or the ranking values. In some implementations, firewall device 210 may store the information locally. Additionally, or alternatively, firewall device 210 may provide the information to another device, such as server device 220 (e.g., periodically, on request, upon reaching a threshold value of the match counts and/or the ranking values, etc.). In this way, firewall device 210 may determine match counts and/or ranking values of implemented firewall rules, to assist firewall device 210 and/or server device 220 in predicting a ranking value of an unimplemented (new) firewall rule. By predicting the ranking value of the unimplemented (new) firewall rule, firewall device 210 may reduce processor power consumption of firewall device 210 by more accurately ranking the unimplemented (new) firewall rule relative to the implemented firewall rules, which may reduce a quantity of the implemented firewall rules that firewall device 210 is required to check.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for predicting a ranking value of an unimplemented (new) firewall rule based on match counts and/or ranking values of implemented firewall rules. In some implementations, one or more process blocks of FIG. 5 may be performed by firewall device 210. Additionally, or alternatively, one or more process blocks of FIG. 5 may be performed by another device or a group of devices separate from or including firewall device 210, such as server device 220.

As shown in FIG. 5, process 500 may include obtaining match counts corresponding to one or more match condition values and ranking values corresponding to one or more implemented firewall rules (block 510). For example, firewall device 210 may enforce a set of implemented firewall rules. The set of implemented firewall rules may be associated with match condition values. Firewall device 210 may obtain match counts associated with the match condition values, and may obtain ranking values associated with the set of implemented firewall rules. Firewall device 210 may train a model based on the match counts and the ranking values of the set of implemented firewall rules, based on which firewall device 210 may predict a ranking value of an unimplemented (new) firewall rule.

In some implementations, firewall device 210 may store the match counts and/or ranking values locally. For example, firewall device 210 may determine the match counts of the match condition values and/or the ranking values of the set of implemented firewall rules, and may store the match counts and/or the ranking values locally. Additionally, or alternatively, firewall device 210 may obtain the match counts and/or the ranking values from another device, such as server device 220, or the like. For example, server device 220 may store match counts and/or ranking values that are determined by firewall device 210 or another device (e.g., another firewall device 210, etc.), and may provide the match counts and/or ranking values to firewall device 210 (e.g., upon receiving a request from firewall device 210, without receiving a request from firewall device 210, etc.).

As further shown in FIG. 5, process 500 may include training a model based on the match counts and the ranking values of the one or more implemented firewall rules (block 520). For example, firewall device 210 may train a model based on known match counts and known ranking values of the one or more implemented firewall rules. The model may determine a relationship between the known match counts of match condition values, and the known ranking values. The model may predict, given match condition values of an unimplemented (new) firewall rule as input, a ranking value of the unimplemented (new) firewall rule.

In some implementations, the model may be trained based on a linear regression analysis, a nonlinear regression analysis, a curve fitting analysis, a segment linear regression analysis, a machine learning method, or the like. Firewall device 210 may train the model using a first training set of match condition values and ranking values, or using a second training set of match condition values and training values, where the first set is smaller in size than the second set. By training the model using the first set of match condition values and ranking values, firewall device 210 may reduce processor power used to train the model. By training the model using the second set of match condition values and ranking values, firewall device 210 may improve accuracy of the prediction made using the model.

In some implementations, firewall device 210 may receive an input indicating a desired accuracy of predictions made using the model. For example, the input may indicate a desired range of accuracy of ranking values predicted using the model. In such cases, firewall device 210 may select (e.g., automatically, without user input) a size of a training set. For example, firewall device 210 may select a smaller training set (e.g., smaller than a larger training set) in situations when the input indicates a relatively low desired accuracy, and/or may select a larger training set in situations when the input indicates a relatively high desired accuracy (e.g., relatively high compared to the relatively low desired accuracy). In this way, firewall device 210 may automatically determine a size of a training set based on a desired accuracy, which may conserve processor power of firewall device 210.

In some implementations, firewall device 210 may perform a linear regression analysis and/or a least squares estimation, based on known match counts and known ranking values, to train the model. For example, firewall device 210 may use the known match counts as independent variables and the known ranking values as dependent variables, and may train the model using a linear regression analysis. To assess accuracy of the model, firewall device 210 may perform an ordinary least squares estimation, a generalized least squares estimation, an iteratively reweighted least squares estimation, or the like, to determine a fit of the model as compared to the known match counts and/or the known ranking values. Based on the fit of the model, firewall device 210 may perform an action, such as modifying one or more model rules and/or increasing or decreasing the size of the training set.

In some implementations, firewall device 210 may train the model based on an interaction term that describes an interaction between two or more match counts of match condition values. The interaction term may describe a relationship between two or more match counts. For example, assume that firewall device 210 calculates an interaction term based on a source IP address match condition value and a destination IP address match condition value. In that case, the interaction term may identify a predicted or observed effect, on a destination IP address match count, of changing a source IP address match count, and/or vice versa. By determining an interaction term when training the model, firewall device 210 may improve accuracy of the model, which may conserve processor power when determining predicted ranking values and/or implementing firewall rules.

Firewall device 210 may improve accuracy of the model by training the model based on known match counts and known ranking values, in some implementations. For example, firewall device 210 may guess one or more preliminary rules of a model. Using the model and the one or more preliminary rules, firewall device 210 may compute a calibration ranking value of a firewall rule, and may perform a comparison of the calibration ranking value to a known ranking value of the firewall rule. Based on performing the comparison, firewall device 210 may modify the preliminary rules and/or operations of the model, to improve accuracy of the model in view of the known ranking value. In this way, firewall device 210 may improve accuracy of the model, which may improve accuracy of predicted ranking values and, thus, conserve processor power of firewall device 210 when determining a firewall rule to apply to a given packet.

In some implementations, firewall device 210 may train the model iteratively based on a new firewall rule. For example, after implementing a new firewall rifle based on a predicted rating value, firewall device 210 may determine an actual ranking value of the new firewall rule (e.g., based on applying the new firewall rule to one or more packets). Firewall device 210 may compare the predicted rating value to the actual ranking value, and may update the model based on comparing the predicted ranking value and the actual ranking value. In this way, firewall device 210 may improve accuracy of the model and/or the predicted ranking values, which may conserve processor power of firewall device 210, by reducing a quantity of inaccurately ranked new firewall rules.

As a simple example, assume that a training set of implemented firewall rules is associated with a set of five match conditions and a set of ranking values of implemented firewall rules. The five match conditions are denoted in this example as Match1 through Match5, and a ranking value of a firewall rule is denoted as R. The variables of Match1 through Match5 may be associated with different types of match conditions. For example, Match1 may be associated with a source IP address match condition, Match2 may be associated with a destination IP address match condition, and so on. The model may be trained on this training set to predict a ranking value (e.g., R) of a firewall rule associated with match condition values corresponding to the match conditions. As an example, the model may be represented by the following formula:

$$R = R0 + (M0*Match1) + (M1*Match2) + \ldots + (M4*Match5).$$

Here, parameters (e.g., R0, M0, M1, etc.) may be determined and/or modified (e.g., refined) by performing a linear regression analysis based on match counts associated with the match condition values, and based on the ranking values of the set of implemented firewall rules. Additionally, or alternatively, the parameters may be determined and/or modified (e.g., refined) by iteratively applying a machine learning algorithm based on known snatch counts and known ranking values. In this model, interaction terms are omitted. An example implementation that includes an interaction term is described in detail in connection with FIG. 6, below.

To predict a predicted ranking value of an unimplemented (new) firewall rule, firewall device 210 may input, for match condition values of the unimplemented (new) firewall rule for Match1 through Match5, match counts corresponding to the match condition values to the model. The model may output a predicted ranking value of the unimplemented (new) firewall rule.

As further shown in FIG. 5, process 500 may include receiving an unimplemented (new) firewall rule that is associated with one or more match condition values (block 530). For example, firewall device 210 may receive an unimplemented (new) firewall rule. The unimplemented (new) firewall rule may be associated with one or more match condition values. Some, or all, of the match condition values of the unimplemented (new) firewall rule may also be associated with one or more firewall rules of the set of implemented firewall rules. For example, a match condition value of a particular source IP address may be common to the unimplemented (new) firewall rule and one or more implemented firewall rules. Firewall device 210 may obtain (e.g., determine) match counts of the one or more match condition values, and may use the match counts as inputs to the model to predict a ranking value of the unimplemented firewall rule, as described in more detail in connection with block 540, below.

As further shown in FIG. 5, process 500 may include predicting a ranking value, corresponding to the unimplemented (new) firewall rule, using the model (block 540). For example, firewall device 210 may determine a predicted ranking value corresponding to the unimplemented (new) firewall rule. Firewall device 210 may determine the predicted ranking value by inputting, into the model, match counts of match condition values associated with the unimplemented (new) firewall rule. The model may predict a ranking value of the unimplemented (new) firewall rule based on match counts of the unimplemented (new) firewall rule.

In the example provided above, firewall device 210 may predict the ranking value by performing operations prescribed by model. To determine a predicted ranking value, a particular match count, corresponding to a match condition value of an unimplemented (new) firewall rule, may be substituted for a variable in a formula (e.g., as described in connection with block 520, above). For example, assume that a source IP address of 102.5,23.23 is associated with a match count of 25 hits. Assume that an unimplemented (new) firewall rule includes a match condition value of the source IP address of 102.5.23.23. Assume further that Match1, as shown in the formula described in connection with block 520, is associated with the source IP address match condition value. In this case, when determining a predicted ranking value of the unimplemented (new) firewall rule, firewall device 210 may substitute, for Match1 in the formula described in connection with block 520, the match count of 25. Firewall device 210 may substitute parameters and other match counts, corresponding to other match condition values, for the other variables in the above formula. For example, firewall device 210 may substitute a match count of a destination IP address match condition value for Match2, may substitute a match count of a source network port match condition value for Match3, and so on. Firewall device 210 may perform operations prescribed by the above formula (e.g., multiplying the match count of 25 by a value of the parameter of M0, multiplying the other match counts by values of other parameters, adding a value of the parameter of R0, etc.) to determine the predicted ranking value of the unimplemented (new) firewall rule.

As further shown in FIG. 5, process 500 may include performing an action, with respect to the unimplemented (new) firewall rule, based on the predicted ranking value (block 550). For example, firewall device 210 may perform an action, with respect to the unimplemented (new) firewall rule, based on the predicted ranking value. In some implementations, when performing the action, firewall device 210 may store the new firewall rule and the ranking value in a data structure, may provide the new firewall rule and/or the ranking value to another device (e.g., server device 220), may apply the new firewall rule based on the new firewall rule matching a packet, or the like.

In some implementations, firewall device 210 may reorder a set of firewall rules based on the predicted ranking value. For example, firewall device 210 may rank a new firewall rule above an implemented firewall rule based on the predicted ranking value and based on a ranking value of the implemented firewall rule. Based on the ranks, firewall device 210 may check whether the new firewall rule applies to a packet before checking whether the implemented firewall rule applies to the packet, and may conserve processor power by not checking the implemented firewall rule in situations where the new firewall rule applies to the packet.

In some implementations, firewall device 210 may not implement a new firewall rule based on a predicted ranking value. For example, firewall device 210 may determine that the predicted ranking value exceeds, does not exceed, etc. a threshold, and may not implement the new firewall rule accordingly.

Although FIG. 5 shows example blocks of process 500, in some implementations, process 500 may include additional blocks, fewer blocks different blocks, or differently arranged blocks than those depicted in FIG. 5. Additionally, or alternatively, two or more of the blocks of process 500 may be performed in parallel.

Figure 6A:
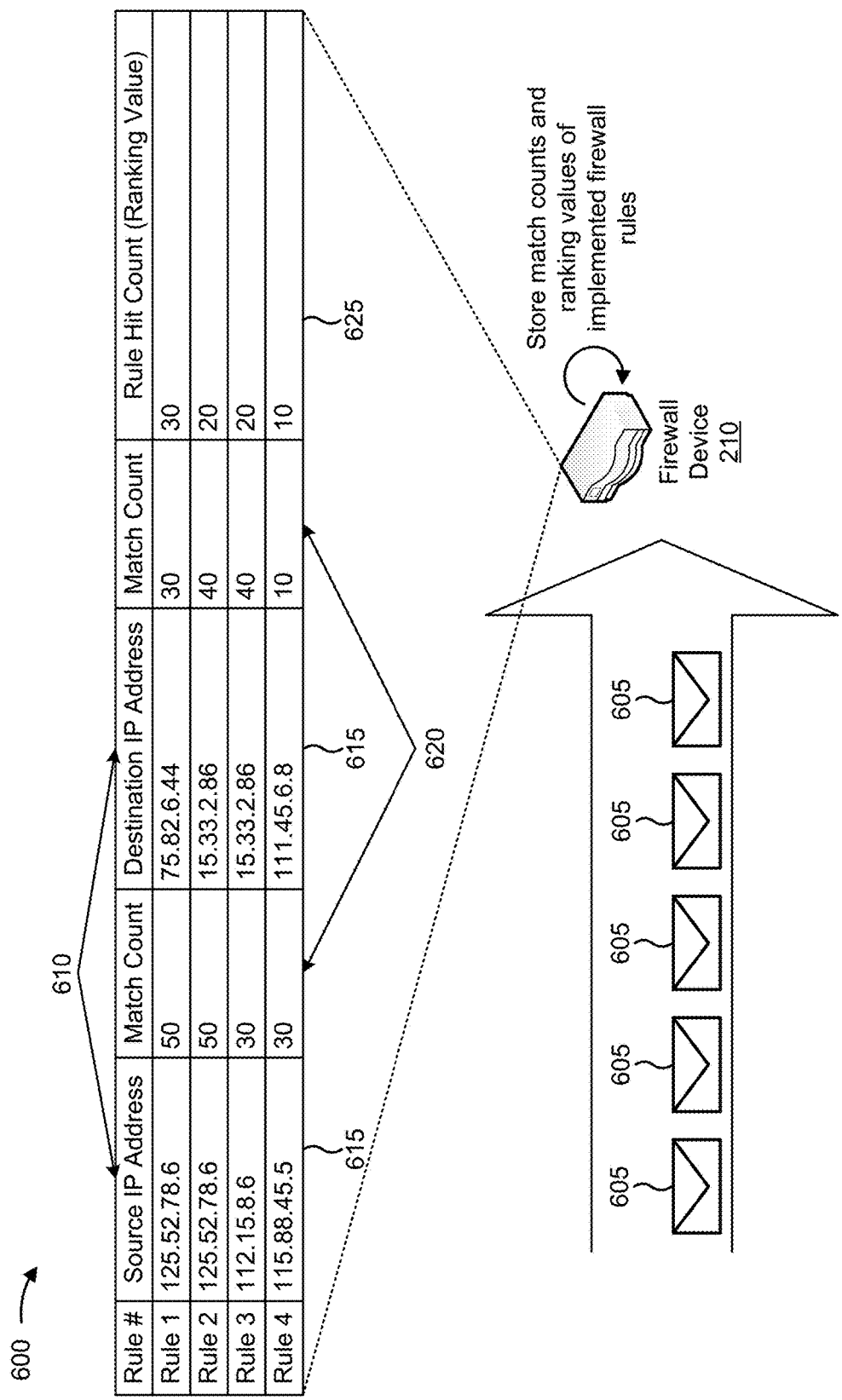
FIGS. 6A-6C are diagrams of an example implementation relating to the example processes shown in FIGS. 4 and 5.
Figure 6B:
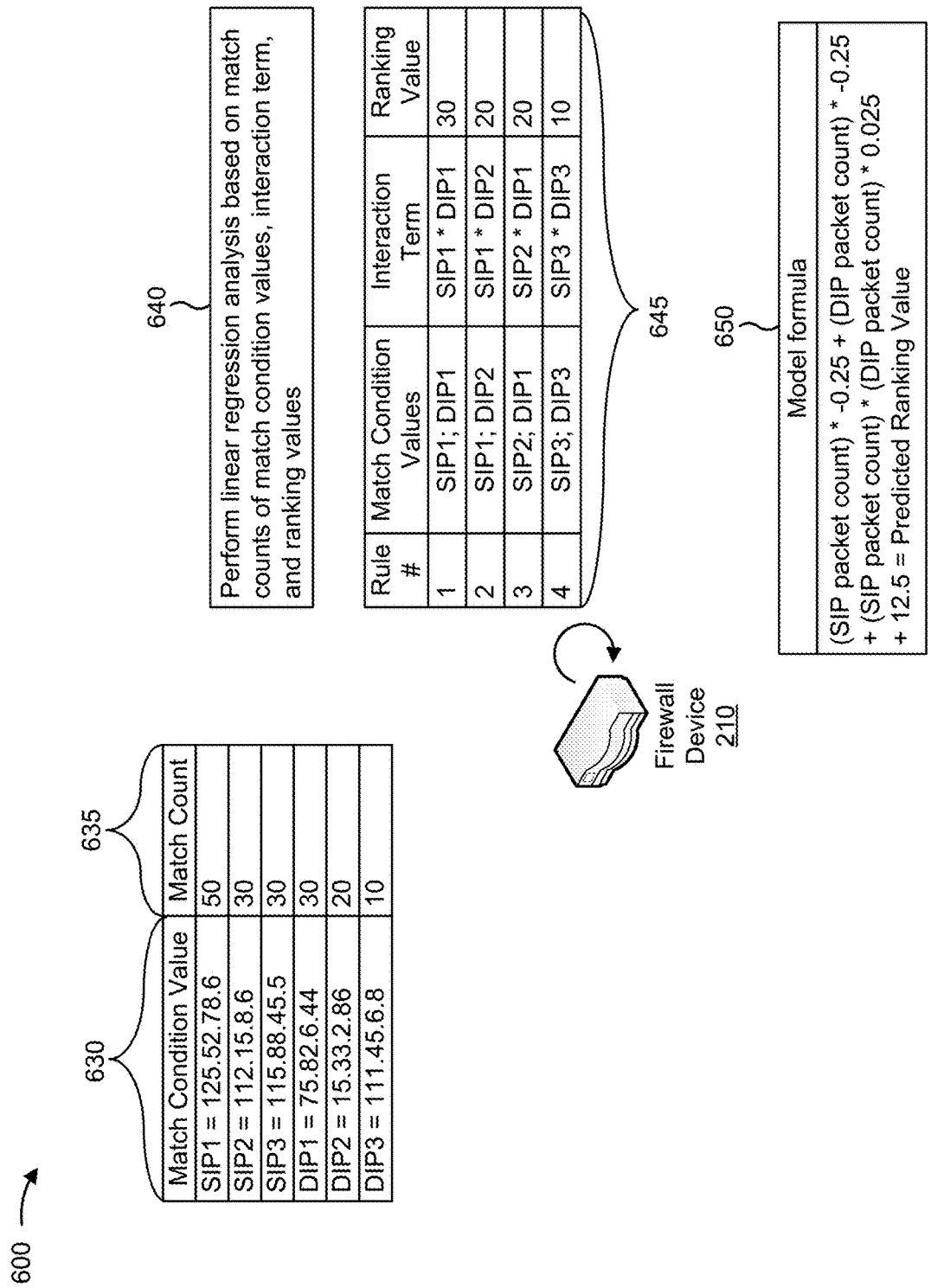
Figure 6C:
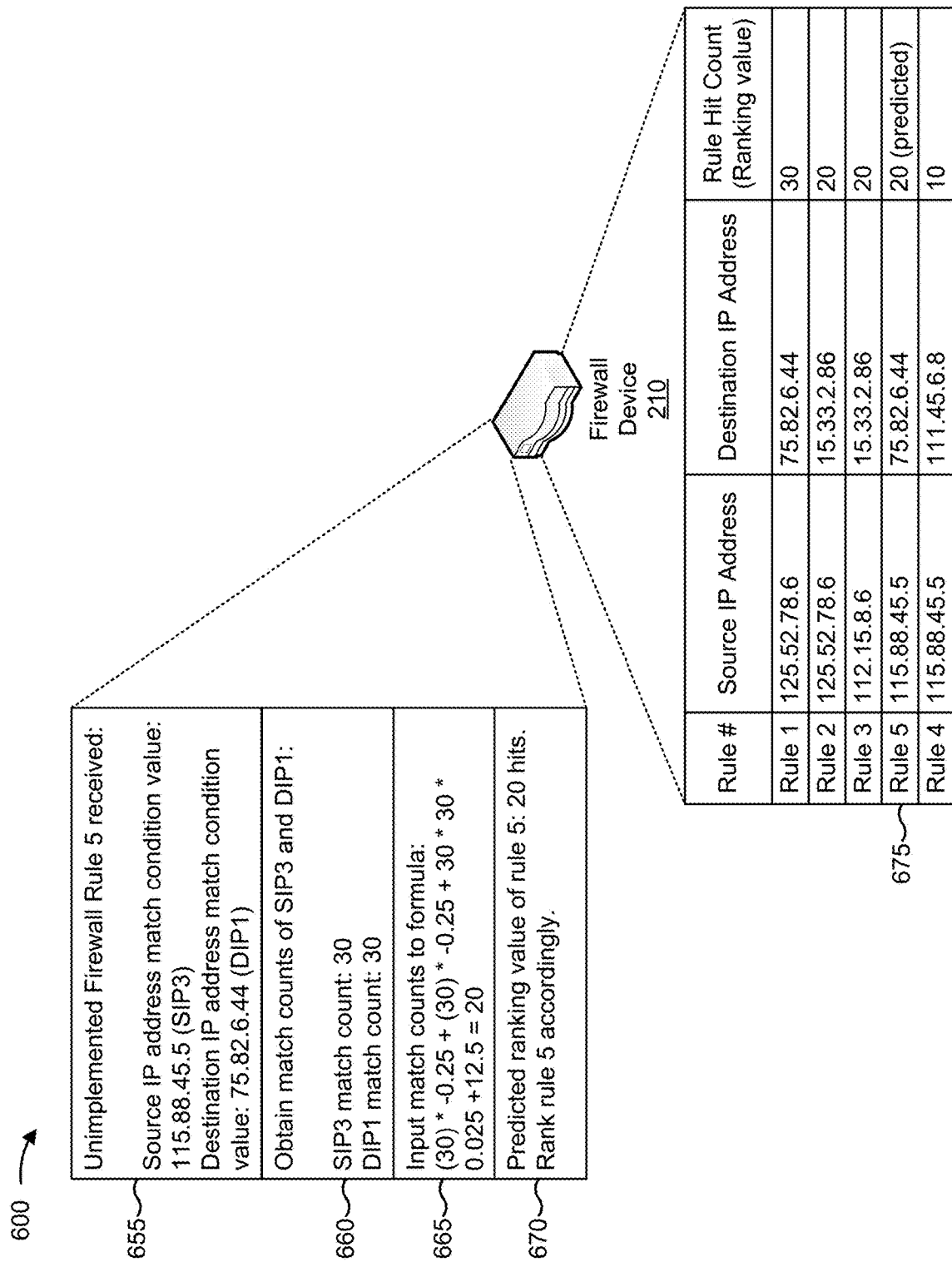

FIGS. 6A-6C are diagrams of an example implementation 600 relating to example processes 400 and 500 shown in FIGS. 4 and 5. FIGS. 6A-6C show an example of predicting a ranking value of an unimplemented (new) firewall rule based on match counts of implemented firewall rules.

As shown in FIG. 6A, and by reference number 605, firewall device 210 may receive packets. Assume that each packet 605 is associated with a respective source IP address and a respective destination IP address. As further shown, firewall device 210 may enforce a set of firewall rules (e.g., Rule 1, Rule 2, Rule 3, and Rule 4) to filter the packets 605. As shown by reference number 610, each firewall rule may be associated with two match condition values (e.g., a first match condition value of a Source IP Address and a second match condition value of a Destination IP Address). As shown by reference number 615, the match condition values may identify particular source IP addresses. Here, the Source IP Address match condition values are shown as 125.52.78.6, 112.15.8.6, and 115.88.45.5, and the Destination IP Address match condition values are shown as 75.82.6.44, 15.33.2.86, and 111.45.6.8.

As shown by reference number 620, each match condition value may be associated with a respective match count. Assume that the match counts identify a quantity of times that firewall rules, associated with the corresponding match condition values, have been applied to packets 605. As shown by reference number 625, each firewall rule is associated with a rule hit count. The rule hit count may identify a quantity of times that a corresponding firewall rule has been applied to packets 605. Here, as shown, the rule hit count is used as a ranking value to rank the set of firewall rules. Assume that firewall device 210 ranks the firewall rules based on the ranking values (e.g., rule hit counts) associated with the firewall rules. As shown, a firewall rule with a higher ranking value is ranked more highly than a firewall rule with a lower ranking value. As shown, firewall device 210 may store the match counts and the ranking values of the set of firewall rules.

As shown in FIG. 6B, and by reference number 630, firewall device 210 may associate the match condition values with variable names. Here, a match condition value of 125.52.78.6 is associated with a variable name of "SIP1," a match condition value of 112.15.8.6 is associated with a variable name of "SIP2," and a match condition value of 115,88.45.5 is associated with a variable name of "SIP3." As further shown, a match condition value of 75.82.6.44 is associated with a variable name of "DIP1," a match condition value of 15.33.2.86 is associated with a variable name of "DIP2," and a match condition value of 111.45.6.8 is associated with a variable name of "DIP3."

As shown by reference number 635, the match counts may be associated with the match condition values. Here, a match count of 50 is associated with the match condition value of SIP1, a match count of 30 is associated with the match condition value of SIP2, a match count of 30 is associated with the match condition value of SIP3, a match count of 30 is associated with the match condition value of DIP1, a match count of 20 is associated with the match condition value of DIP2, and a match count of 10 is associated with the match condition value of DIP3.

As shown by reference number 640, firewall device 210 may perform linear regression analysis based on the match counts of the match condition values, an interaction term, and the ranking values shown by reference number 645 to train a model. As shown by reference number 650, assume that the model is represented by a formula for determining ranking values of unimplemented (new) firewall rules. Here, the formula is shown as:

(SIP packet count)*−0.25+(DIP packet count)*−0.25+(SIP packet count)*(DIP packet count)*0.025+12.5=Predicted firewall rule ranking value.

Firewall device 210 may train the model based on match counts associated with SIP1, SIP2, SIP3, DIP1, DIP2, and DIP3, and based on an interaction term computed by multiplying SIP packet counts by corresponding DIP packet counts, as independent variables, and using ranking values associated with Rule 1, Rule 2, Rule 3, and Rule 4 as dependent variables. Firewall device 210 may train the model based on the match count of SIP1, the match count of DIP1, and the ranking value of Rule 1, and the respective match counts and respective ranking values of Rule 2, Rule 3, and Rule 4.

Here, assume that firewall device 210 guesses the rules of the model, inputs the match counts of match condition values associated with Rule 1 through Rule 4, and compares calibration ranking values, predicted by the model, to the actual ranking values. Based on comparing the calibration ranking values to the actual ranking values, firewall device 210 may update the rules to improve accuracy of the model. Assume, for the purpose of this example, that the parameters of −0.25, −0.25, 0.025, and 12.5 are determined based on guessing and updating the rules of the model.

As shown in FIG. 6C, and by reference number 655, firewall device 210 may receive an unimplemented (new) firewall rule (e.g., Unimplemented Firewall Rule 5). As shown, the unimplemented (new) firewall rule may be associated with a source IP address match condition value (e.g., a source IP address of 115.88.45.5, corresponding to the variable of SIP3) and a destination IP address match condition value (e.g., a destination IP address of 75.82.6,44, corresponding to the variable of DIP1). As shown by reference number 660, firewall device 210 may obtain match counts associated with the variables of SIP3 and DIP1. As further shown, the match count associated with SIP3 is 30, and the match count associated with DIP1 is 30. As shown by reference number 665, firewall device 210 may use the model determined in connection with FIG. 6B in order to determine a predicted ranking value of Unimplemented Firewall Rule 5. As shown, firewall device 210 substitutes the match count associated with SIP3 for "SIP packet count," and firewall device 210 substitutes the match count associated with DIP1 for "DIP packet count." As further shown, firewall device 210 performs the operations indicated by the formula to determine a predicted ranking value of 20 hits.

As shown by reference number 670, firewall device 210 ranks Unimplemented Firewall Rule 5 based on the predicted ranking value. As shown by reference number 675, firewall device 210 ranks Unimplemented Firewall Rule 5 above Rule 4 and below Rule 3. Assume that firewall device 210 ranks Unimplemented Firewall Rule 5 above Rule 4 and below Rule 3 based on ranking values associated with Rule 3 and Rule 4, and based on Unimplemented Firewall Rule 5 being implemented more recently than Rule 3.

Firewall device 210 may check match condition values of the set of firewall rules in an order based on the respective ranks of the set of firewall rules. For example, firewall device 210 may check match condition values of Rule 1 first, Rule 2 second, Rule 3 third, Unimplemented Firewall Rule 5 fourth, and Rule 4 fifth. Based on predicting that Unimplemented Firewall Rule 5 will be associated with a higher ranking value than Rule 4, firewall device 210 ranks Unimplemented Firewall Rule 5 above Rule 4. In this way, firewall device 210 may conserve processing power of firewall device 210, by checking Unimplemented Firewall Rule 5 before Rule 4, based on Unimplemented Firewall Rule 5 being more likely to apply to packets than Rule 4.

In some implementations, firewall device 210 may update the model and/or a ranking value of Unimplemented Firewall Rule 5 based on an actual ranking value of Unimplemented Firewall Rule 5. For example, after implementing Unimplemented Firewall Rule 5, firewall device 210 may determine an actual ranking value of Unimplemented Firewall Rule 5 based on a quantity of times that Unimplemented Firewall Rule 5 is applied to packets. Firewall device 210 may compare the actual ranking value to the predicted ranking value, and may update rules of the model accordingly. Additionally, or alternatively, firewall device 210 may replace the predicted ranking value with the actual ranking value, and may update a rank of Unimplemented Firewall Rule 5 accordingly. In some implementations, firewall device 210 may replace the predicted ranking value with the actual ranking value after a particular period of time, after a particular quantity of packets has been received, or the like. In this way, firewall device 210 may iteratively p se the model, which may increase accuracy of the model and/or reduce processor power use by reducing risk of inaccurate predicted ranking values.

As indicated above. FIGS. 6A-6C are provided merely as an example. Other examples are possible and may differ from what was described with regard to FIGS. 6A-6C.

Implementations described herein may enable a firewall device to predict a ranking value of an unimplemented (new) firewall rule based on match counts and ranking values of implemented firewall rules, which may aid the firewall device in determining a ranking of the unimplemented firewall rule, relative to rankings of the implemented firewall rules, before implementing the unimplemented firewall rule. By determining the rankings before implementing the unimplemented (new) firewall rule, the firewall device may determine an order in which to check the implemented firewall rules and the unimplemented (new) firewall rule based on a likelihood of applying the implemented and/or unimplemented firewall rules to packets. In this way, the firewall device may conserve processor power, by checking firewall rules that are more likely to apply to a packet before checking firewall rules that are less likely to apply to a packet (e.g., less likely to apply than the firewall rules that are more likely to apply).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, a packet may refer to a network packet, a frame, a datagram, a segment, a fragment of a network packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more," Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive an input indicating a desired accuracy of predictions made using a model:
      determine a size of a training set based on the desired accuracy indicated by the input;
      train the model based on the size of the training set, match counts of match conditions corresponding to a plurality of firewall rules, and performing an analysis of the match counts, of the match conditions corresponding to the plurality of firewall rules, and ranking values corresponding to the plurality of firewall rules;
      receive an unimplemented firewall rule comprising one or more first match condition values;
      identify match counts of the one or more first match condition values based on identifying one or more second match condition values, corresponding to the plurality of firewall rules, that match the one or more first match condition values;
      predict, based on the match counts of the one or more first match condition values, a ranking value corresponding to the unimplemented firewall rule using the model;
      perform an action on a packet, with regard to the unimplemented firewall rule, based on the predicted ranking value;
      determine an actual ranking value for the unimplemented firewall rule;
      perform a comparison of the predicted ranking value and the actual ranking value;
      update the model based on the comparison; and
      replace the predicted ranking value with the actual ranking value after a particular quantity of packets have been received by the device or after a particular period of time has expired.

2. The device of claim 1, where the model is trained based on at least one of:
  a linear regression analysis,
  a nonlinear regression analysis, a curve fitting analysis,
  a segment linear regression analysis, or a machine learning method.

3. The device of claim 1, where the size of the training set is correlated with a level of the desired accuracy.

4. The device of claim 1, where the one or more processors are further to:
  perform a linear regression analysis to train the model based on using one or more of the match counts, of the match conditions corresponding to the plurality of firewall rules, as an independent variable and one or more of the ranking values as a dependent variable.

5. The device of claim 1, where the one or more processors, when training the model, are to:
  train the model based on an interaction term describing an interaction between two or more of the match counts of the match conditions corresponding to the plurality of firewall rules.

6. The device of claim 5, where the interaction term is calculated based on a source internet protocol (IP) address match condition value and a destination IP address match condition value.

7. The device of claim 1, where the one or more processors are further to:
  compute a calibration ranking value of a particular firewall rule of the plurality of firewall rules using the model and one or more preliminary rules;
  perform a comparison of the calibration ranking value and a known ranking value of the particular firewall rule; and
  modify at least one of the one or more preliminary rules or the model based on the comparison.

8. A non-transitory computer-readable medium storing instructions, the instructions comprising:
  one or more instructions that, when executed by one or more processors of a device, cause the one or more processors to:
    receive an input indicating a desired accuracy of predictions made using a model;
    determine a size of a training set based on the desired accuracy indicated by the input;
    train the model based on the size of the training set, match counts of match conditions corresponding to a plurality of firewall rules, and performing an analysis of the match counts, of the match conditions corresponding to the plurality of firewall rules, and ranking values corresponding to the plurality of firewall rules;
    receive an unimplemented firewall rule comprising one or more first match condition values;
    identify match counts of the one or more first match condition values based on identifying one or more second match condition values, corresponding to the plurality of firewall rules, that match the one or more first match condition values;
    predict, based on the match counts of the one or more first match condition values, a ranking value corresponding to the unimplemented firewall rule using the model;
    perform an action on a packet, with regard to the unimplemented firewall rule, based on the predicted ranking value;
    determine an actual ranking value for the unimplemented firewall rule;
    perform a comparison of the predicted ranking value and the actual ranking value;
    update the model based on the comparison; and
    replace the predicted ranking value with the actual ranking value after a particular quantity of packets have been received by the device or after a particular period of time has expired.

9. The non-transitory computer-readable medium of claim 8, where the one or more instructions, when executed by the one or more processors, cause the one or more processors to:
  compute a calibration ranking value of a particular firewall rule of the plurality of firewall rules using the model and one or more preliminary rules;
  perform a comparison of the calibration ranking value and a known ranking value of the particular firewall rule; and
  modify at least one of the one or more preliminary rules or the model based on the comparison.

10. The non-transitory computer-readable medium of claim 8, where the one or more instructions, that cause the one or more processors to predict the ranking value, cause the one or more processors to:
  predict the ranking value based on using the match counts, of the one or more first match condition values, as inputs to the model.

11. The non-transitory computer-readable medium of claim 8, where the one or more instructions, that cause the one or more processors to perform the action, cause the one or more processors to at least one of:
  store the unimplemented firewall rule and the predicted ranking value in a data structure;
  provide at least one of the unimplemented firewall rule or the predicted ranking value to another device; or
  apply the unimplemented firewall rule based on the unimplemented firewall rule matching the packet.

12. The non-transitory computer-readable medium of claim 8, where the one or more instructions, when executed by the one or more processors, cause the one or more processors to:
  reorder a set of firewall rules based on the predicted ranking value.

13. The non-transitory computer-readable medium of claim 8, where the one or more instructions, when executed by the one or more processors, cause the one or more processors to:
  rank the unimplemented firewall rule above a particular firewall rule of the plurality of firewall rules based on the predicted ranking value; and
  check whether the unimplemented firewall rule applies to the packet before checking whether the particular firewall rule applies to the packet based on ranking the unimplemented firewall rule above the particular firewall rule.

14. The non-transitory computer-readable medium of claim 8, where the model is trained based on at least one of:
  a linear regression analysis,
  a nonlinear regression analysis,
  a curve fitting analysis,
  a segment linear regression analysis, or
  a machine learning method.

15. A method, comprising:
  receiving, by a device, an input indicating a desired accuracy of predictions made using a model;
  determining, by the device, a size of a training set based on the desired accuracy indicated by the input;
  training, by the device, the model based on the size of the training set, match counts of match conditions corresponding to a plurality of firewall rules, and performing an analysis of the match counts, of the match conditions corresponding to the plurality of firewall rules, and ranking values corresponding to the plurality of firewall rules;

receiving, by the device, an unimplemented firewall rule comprising one or more first match condition values;

identifying, by the device, match counts of the one or more first match condition values based on identifying one or more second match condition values, corresponding to the plurality of firewall rules, that match the one or more first match condition values;

predicting, by the device and based on the match counts of the one or more first match condition values, a ranking value corresponding to the unimplemented firewall rule using the model;

performing, by the device and based on the predicted ranking value, an action on a packet with regard to the unimplemented firewall rule;

determining, by the device, an actual ranking value for the unimplemented firewall rule;

performing by the device, a comparison of the predicted ranking value and the actual ranking value;

updating, by the device, the model based on the comparison; and replacing, by the device, the predicted ranking value with the actual ranking value after a particular quantity of packets have been received by the device or after a particular period of time has expired.

16. The method of claim 15, further comprising:
determining that the predicted ranking value satisfies a threshold; and
preventing the unimplemented firewall rule from being implemented based on the predicted ranking value satisfying the threshold.

17. The method of claim 15, further comprising:
determining that the predicted ranking value does not satisfy a threshold; and
preventing the unimplemented firewall rule from being implemented based on the predicted ranking value not satisfying the threshold.

18. The method of claim 15, where the one or more first match condition values includes at least one of:
a source internet protocol (IP) address value;
a destination IP address value;
a source network port value;
a destination network port value;
a protocol value;
a range of IP address values; or
a range of port values.

19. The method of claim 15, where the action is a first action; and
where the method further comprises:
determining that packet information associated with the packet matches each match condition value of a particular firewall rule of the plurality of firewall rules; and
performing a second action indicated by the particular firewall rule based on the packet information matching each match condition value of the particular firewall rule.

20. The method of claim 15, further comprising:
determining that a particular firewall rule of the plurality of firewall rules is applied; and
implementing a match count, of the match counts of the match conditions corresponding to the plurality of firewall rules, corresponding to the particular firewall rule.

* * * * *